(12) United States Patent
Schaefer et al.

(10) Patent No.: US 9,473,064 B2
(45) Date of Patent: Oct. 18, 2016

(54) END CLIP FOR RECESSED RAIL

(71) Applicant: D Three Enterprises, LLC, Lafayette, CO (US)

(72) Inventors: Richard F. Schaefer, Fort Lupton, CO (US); David Kreutzman, Louisville, CO (US)

( * ) Notice: Subject to any disclaimer, the term of this patent is extended or adjusted under 35 U.S.C. 154(b) by 0 days.

(21) Appl. No.: 14/858,339

(22) Filed: Sep. 18, 2015

(65) Prior Publication Data

US 2016/0108941 A1   Apr. 21, 2016

Related U.S. Application Data

(63) Continuation of application No. 62/052,288, filed on Sep. 18, 2014.

(51) Int. Cl.
*A47G 29/02* (2006.01)
*H02S 20/20* (2014.01)
*F16M 13/02* (2006.01)
*F16B 2/12* (2006.01)

(52) U.S. Cl.
CPC ............... *H02S 20/20* (2014.12); *F16B 2/12* (2013.01); *F16M 13/022* (2013.01)

(58) Field of Classification Search
CPC ......... F16B 2/06; F16B 2/12; F16M 13/022; F16M 13/02; H02S 20/20

USPC ............ 248/148, 237, 295.11, 298.1; 52/60, 52/710, 741.4
See application file for complete search history.

(56) References Cited

U.S. PATENT DOCUMENTS

| | | | | |
|---|---|---|---|---|
| 2010/0192505 A1* | 8/2010 | Schaefer | ................ | A47B 96/14 52/653.2 |
| 2012/0144760 A1* | 6/2012 | Schaefer | .................. | E04C 3/06 52/58 |
| 2013/0291479 A1* | 11/2013 | Schaefer | ................ | F24J 2/5245 52/745.21 |
| 2014/0110543 A1* | 4/2014 | Aliabadi | ................ | H02S 20/23 248/201 |
| 2015/0316086 A1* | 11/2015 | Urban | ..................... | F16B 7/187 403/374.3 |

* cited by examiner

*Primary Examiner* — Gwendolyn Baxter
(74) *Attorney, Agent, or Firm* — Marsh Fischmann & Breyfogle LLP

(57) ABSTRACT

A clamp is provided that allows for easily and securely mounting an object such as a PV panel to a rail having an internal recess or channel. The clamp utilizes one or more splice bars that extend into a recess of a rail that supports a PV panel. In one arrangement, the splice bar is inserted through an end of the rail into the recess such that a portion the splice bar extends beyond the end of the rail. A sliding clamp body engages lateral edges of the slice bar to, in one embodiment, compress a PV panel against a surface of the rail. The sliding clamp body may be affixed to the splice bar to secure the panel.

1 Claim, 13 Drawing Sheets

END CLIP FOR RECESSED RAIL

CROSS REFERENCE

The present application claims the benefit of the filing date of U.S. Provisional Application No. 62/052,288 having a filing date of Sep. 18, 2014, the entire contents of which is incorporated herein by reference.

FIELD

The present disclosure is directed to rail mounting systems. More specifically, the present disclosure is directed to a clip that connects within a recess of a rail of a rail mounting system.

BACKGROUND

Photovoltaic (herein, "PV") mounting rail systems are commonly used to mount PV panel arrays to building structures, ground surfaces and a large variety of alternate configurations. In one common configuration, a set of rails are mounted, for example to a rooftop of a home, and the panel arrays are mounted thereto.

In general the PV industry is accustomed to mounting each rail to an underlying structure and using various mechanical fasteners such as nuts, bolts, washers and clamps to affix the panels to the rails. Each connection point is carefully measured and set in place and manually tightened, typically using common tools such as wrenches, sockets, ratchets and screwdrivers. The conventional methods of installation generally consume many man-hours of installation labor and must be placed in precise locations to accommodate the specific PV panels supplied for the installation.

SUMMARY

A novel clamp is provided that allows for easily and securely mounting an object such as a PV panel to a rail having an internal recess or channel. The clamp utilizes one or more splice bars that extend into a recess of a rail. In one arrangement, the splice bar is inserted through an end of the rail into the recess such that a portion the splice bar extends beyond the end of the rail. The portion of the splice bar disposed within the recess of the rail may be secured therein utilizing, for example, a set screw. In one arrangement, the splice bar is configured to be disposed beneath one or more lips within the recess. In such an arrangement, upon tightening a set screw or other fixating device, the splice bar is securely maintained within the recess.

A sliding first clamp body is provided that engages a portion of the splice bar extending beyond the end of the rail. In one arrangement, the first clamp body engages first and second lateral notches on the side surfaces of the splice bar. That is, the clamp body has a lower end with first and second legs that define a recess there between. These legs may fit into the notches such that the clamp body may be adjusted up and down relative to the splice bar. An upper end of the clamp body includes an engagement element that is adapted to fit over an object such as a PV panel and compress it when the clamp is tightened. One non-limiting example of the engagement element is an L-shaped end. However will be appreciated that T-shapes or other configurations are possible and within the scope of the present invention.

An engagement tab is disposed in a mid portion of the clamp body and extends outwardly from a rear surface of the generally planar clamp body. Typically, the tab forms a horizontal surface through which an aperture extends. A bolt or other threaded fastener may extend through this aperture and engage a threaded aperture in the portion of the splice bar extending beyond the end of the rail. Upon tightening the bolt, the tab draws the clamp downward and thereby compresses an object beneath the engagement element against the rail.

In a further arrangement, a second clamp body is provided that engages a portion of the splice bar extending beyond the end of the rail. In one arrangement, the second sliding clamp body engages first and second lateral notches on the side surfaces of the splice bar. That is, the second clamp body has a lower end with first and second legs that define a recess there between. These legs may fit into the notches such that the clamp body may be adjusted up and down relative to the splice bar. An upper end of the clamp body includes an engagement element that is adapted to fit below an object such as a PV panel and compress it when the clamp is tightened. One non-limiting example of the engagement element is an L-shaped end. In one arrangement, the first and second clamp bodies have mating apertures that allow compressing the clamp bodies together. That is, one or more threaded elements (e.g., bolts) may extend through the clamp bodies to attach and or compress these bodies. In this regard, the apertures in one or both of the bodies may be threaded. Such an arrangement allows compressing an object (e.g., PV panel) between the engagement elements of the clamp bodies.

When utilizing two clamp bodies, the height of the clamp bodies may be adjustable to selectively space an object (e.g., PV panel) above a surface of the rail in which the splice bar is disposed. In this regard, one or more bolts may extend through the clamps to engage the splice bar.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1:
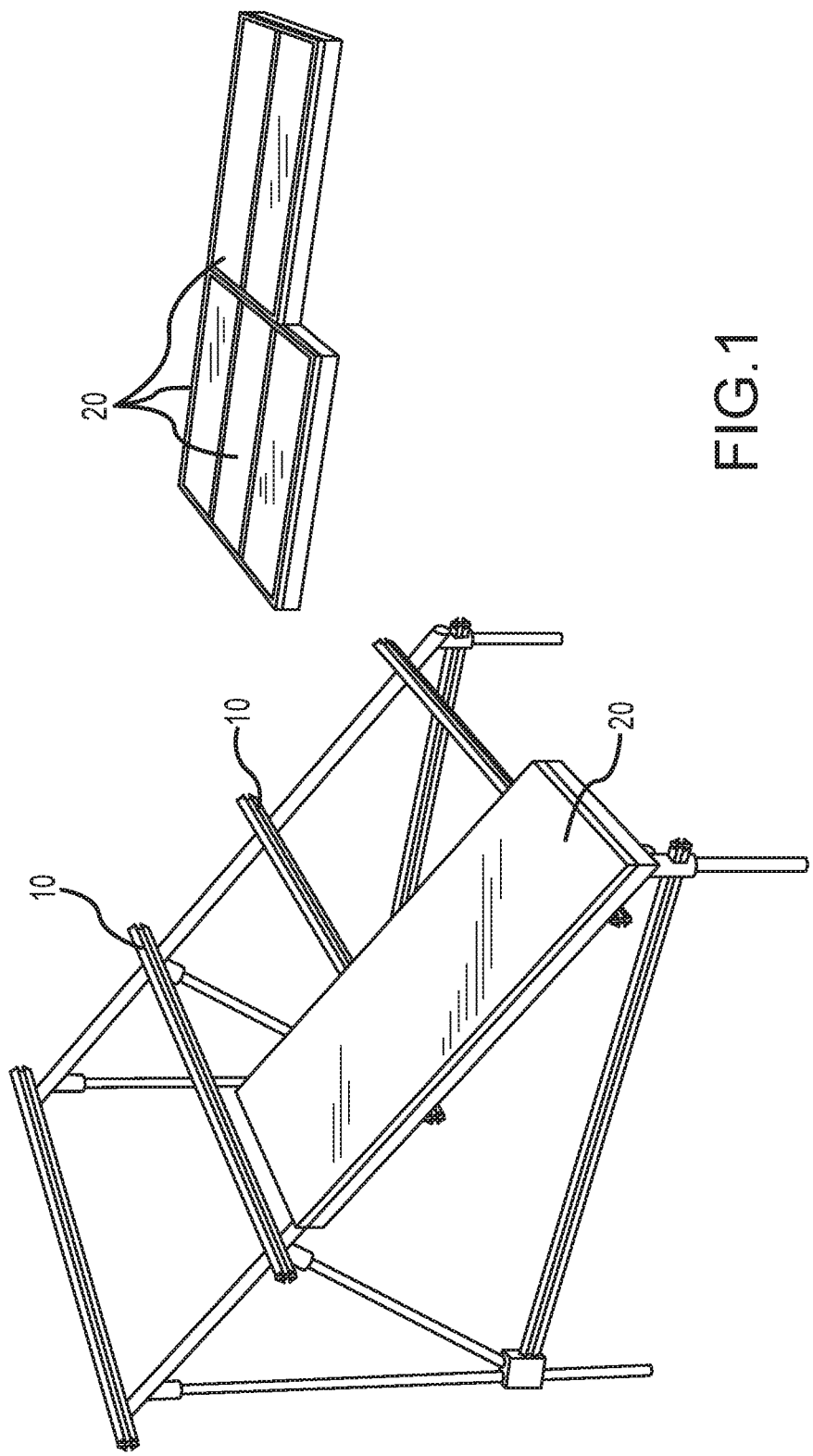
FIG. 1 illustrates a PV panel assembly.

FIG. 1 illustrates one exemplary embodiment of a PV mounting system that utilizes a plurality of rails to securely mount one or more PV panels 20. As shown, the rails may be configured to support the PV panels a desired angle. However, other configurations are possible (e.g., flat mounting etc.). In any case, one or more rails may be joined to form a support structure. Once a support structure is formed, the panels 20 need to be securely fastened to the rails 10.

Figure 2:
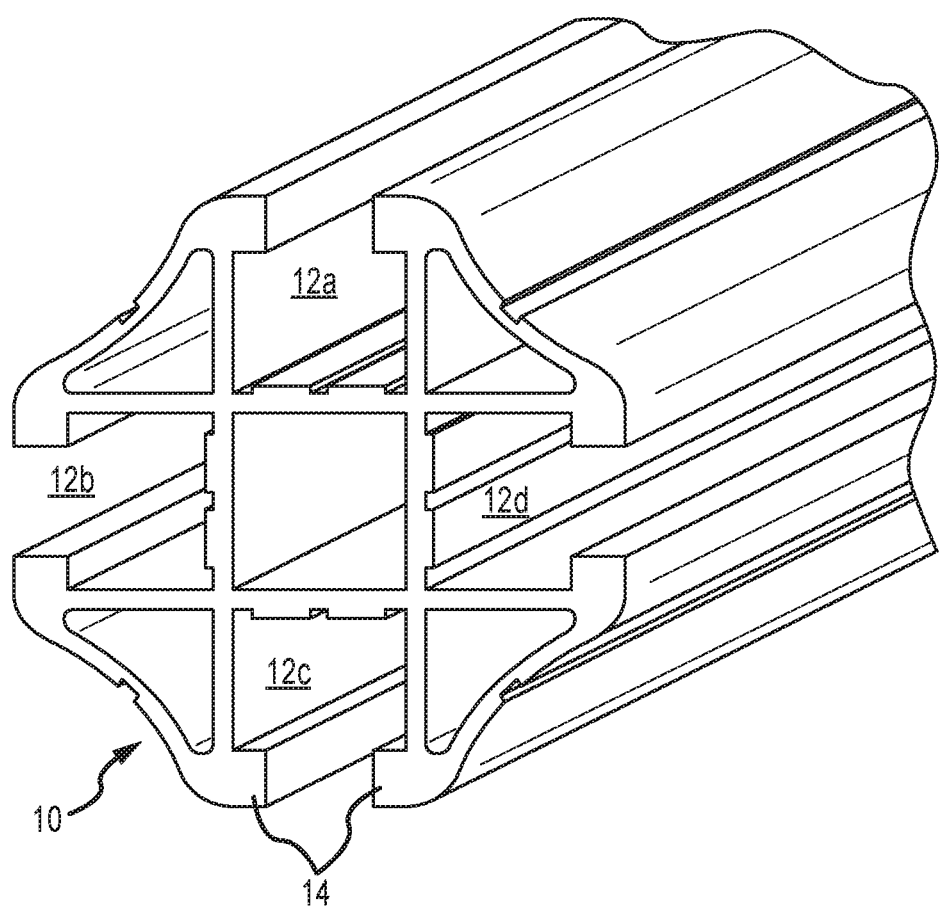
FIG. 2 illustrates a rail that may be utilized in a PV panel assembly.

FIG. 2 illustrates one non-limiting embodiment of a recessed rail 10. As shown, the rail includes four recesses or channels 12A-12D, other rails may have more or fewer recesses. As is typical for such rails, each channel or recess 12 includes an opening and typically two lips 14. That is, a lower portion of the recess is typically wider than the opening into the recess. Such recesses or channels are often used to affix elements relative to the rail 10.

Figure 3:
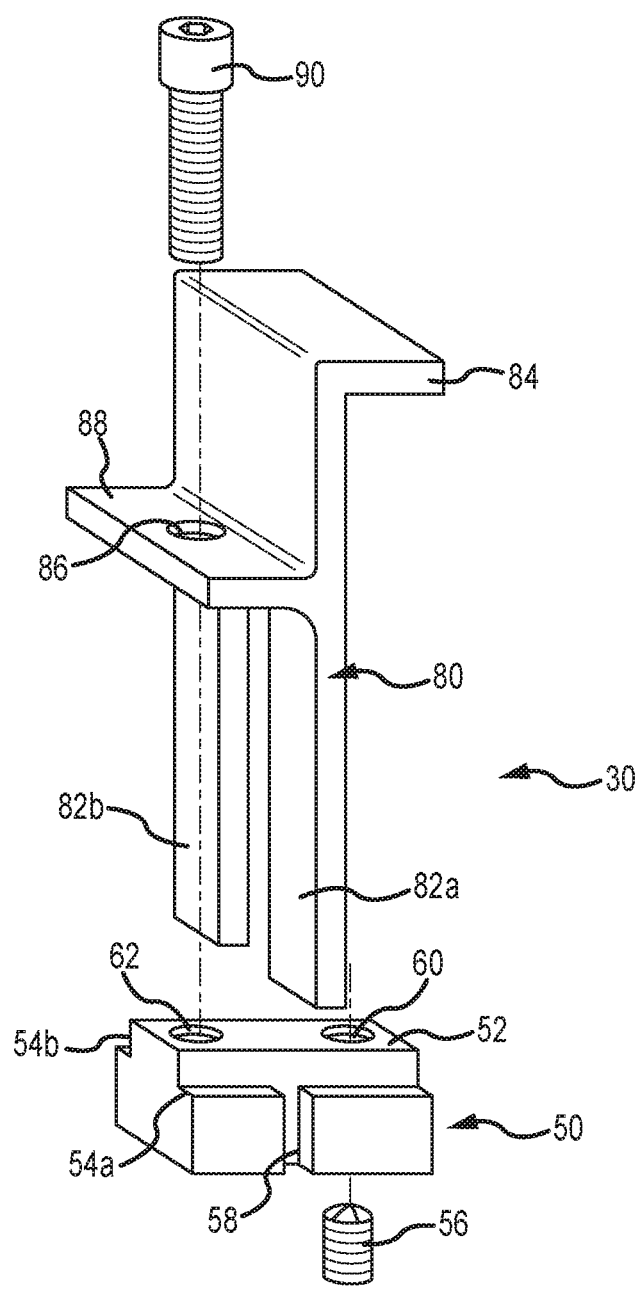
FIG. 3 illustrates is an exploded view of one embodiment of an adjustable clamp that may be utilized with a having a recessed channel.

FIG. 3 illustrates a continually adjustable clamp 30 that may be utilized to secure an object such as a PV panel relative to a rail. The clamp 30 includes two primary components, a splice bar 50 and a clamp body 80. The splice bar 50 has a cross-sectional shape that is designed for receipt within a recessed/channel of a rail. Referring to FIGS. 2 and 3, it is noted that the cross-sec section of the splice bar 50 substantially matches the cross-sectional opening of the recesses 12 in the end of the rail 10. In this regard, the splice bar 50 may be inserted through the end of the rail into the recess. As shown, the splice bar 50 has a central portion 52 that is designed to be accessible through the opening into the recess. Lateral edges 54a, 54b extend outward from the central portion 52. These lateral edges, in the current embodiment are adapted to fit beneath the lips 14 of the recess 12. It will be appreciated that the central portion need not extend above the surface of the lateral edges. That is, in another configuration a square or rectangular block may form the splice bar 50.

In the embodiment illustrated in FIG. 3, the lateral edges include a notch 58 (only one shown) are formed along their length. In the illustrated embodiment, the notches 58 are to a depth that is equal to the width of the central portion 52, however this is not a requirement. The central portion 52 of the splice bar 50 also includes a first threaded aperture 60 and a second threaded aperture 62. In use, the splice bar is inserted into the recess to desired depth and a set screw 56 is threaded into one of the apertures 60 or 62 to affix the splice bar therein.

Figure 4:
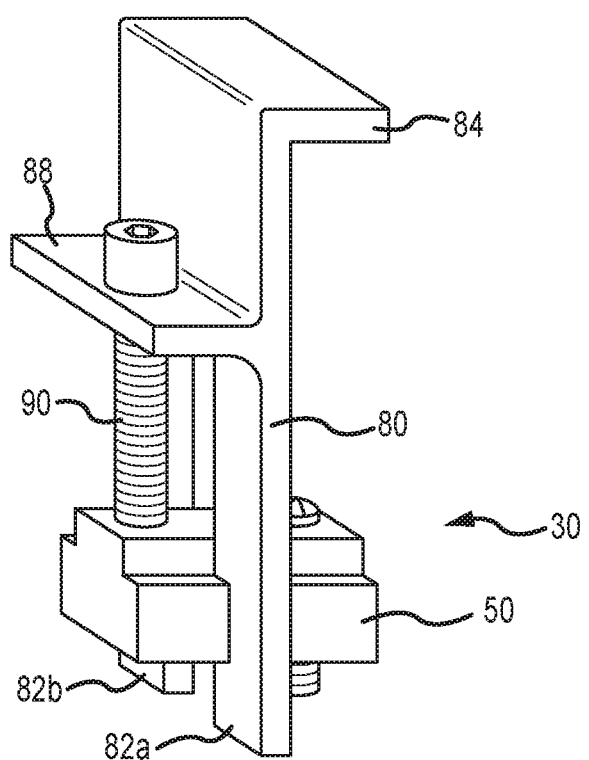
FIG. 4 illustrates the adjustable clamp of FIG. 3 as assembled.

The second primary component of the clamp 30 is the clamp body 80. As shown, a lower portion of the clamp body 80 includes first and second spaced legs 82a, 82b. That is, the legs define a space or recess there between. The spacing between the legs 82a, 82b is sized to permit the clamp body 82 be received within the lateral notches 58 of the splice bar 50 as illustrated in FIG. 4. The length of the legs allows the height of the clamp to be adjusted relative to the splice bar 50.

An upper portion of the clamp body 80 includes an engagement element 84. This engagement element is configured to extend over an object that is to be compressed against a rail. In the illustrated embodiment the engagement element 84 is an L-bracket or cantilevered element that extends away from the generally planar clamp body 80. However, it will be appreciated that other configurations are possible and within the scope of the presented inventions.

Figure 5:
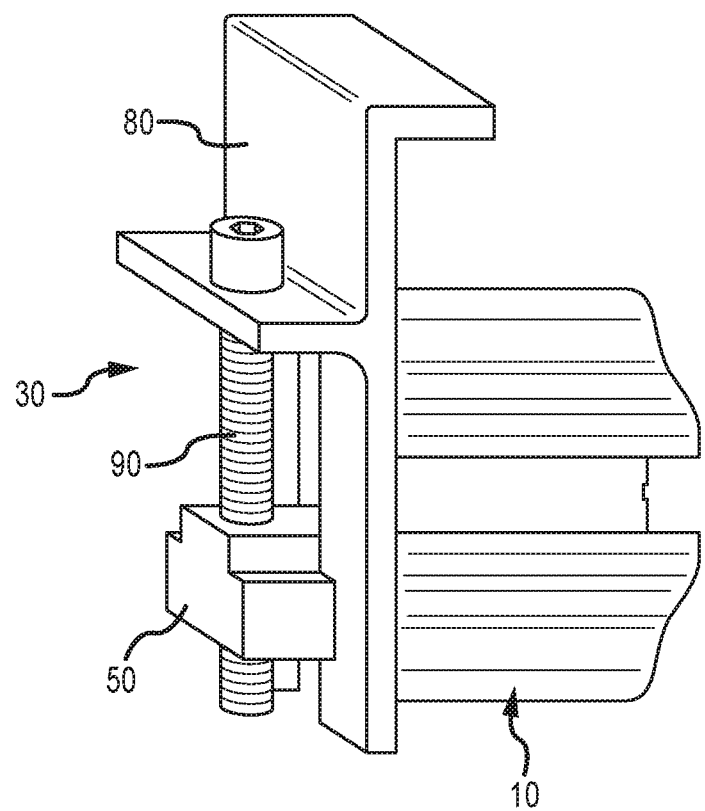
FIG. 5 illustrates the adjustable clamp of FIG. 3 as attached to a rail.

Disposed on a rearward surface of the clamp body 80 is an engagement tab 88. The engagement tab is generally horizontal relative to the planar body, though other configurations are possible. In the illustrated embodiment, the engagement tab extends across the width of the clamp body 80 and includes an aperture 86. As shown in FIG. 4, a bolt or other threaded element extends through the aperture 86 in the tab and into the second threaded aperture 62 of the splice bar 50. The head of the bolt 90 rests on the tab and once the lower end of the bolt is threaded into the threaded aperture 62, tightening of the bolt 90 allows for compressing an object beneath the engagement element against rail. See for example FIG. 5.

Figure 6:
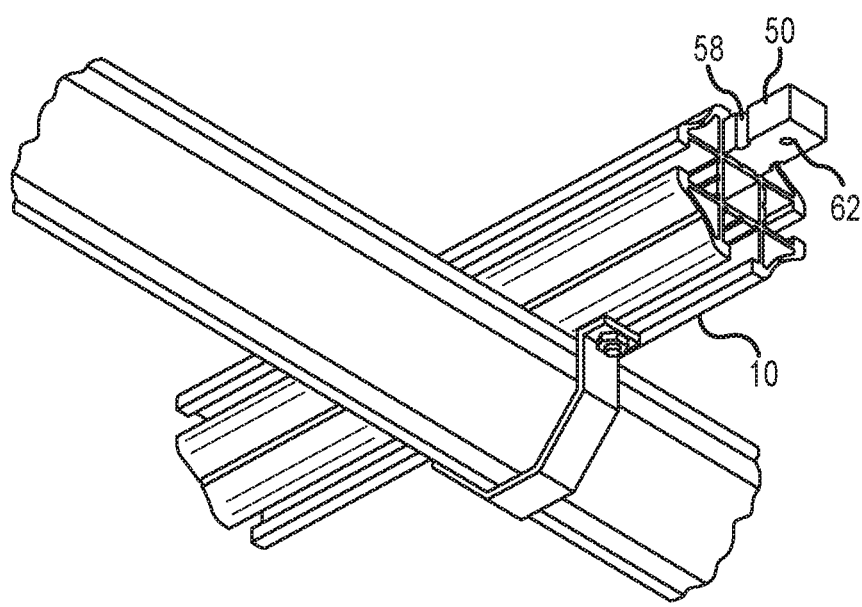
FIG. 6 illustrates insertion of the splice bar into a rail.
Figure 7:
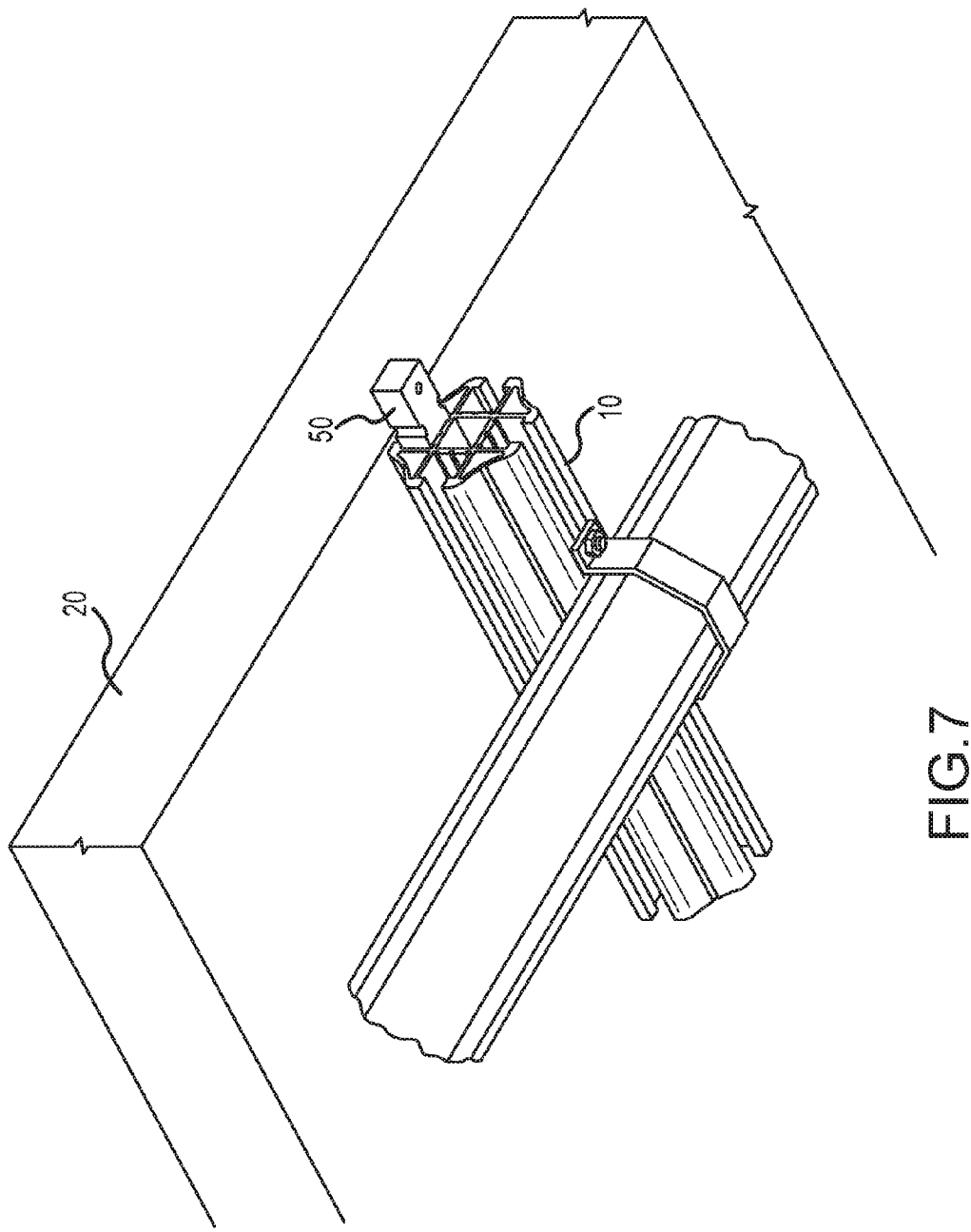
FIG. 7 illustrates placement of a PV panel on the rail of FIG. 6.
Figure 8:
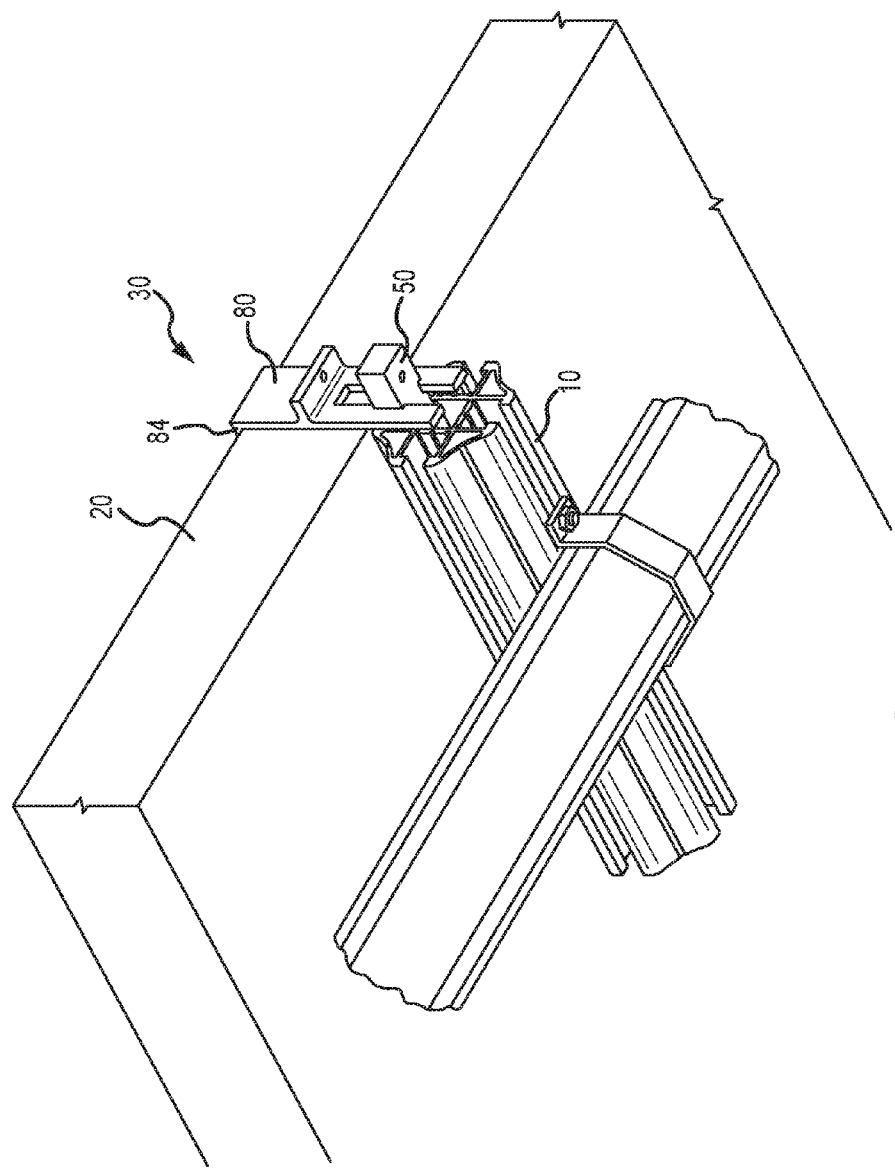
FIG. 8 illustrates disposition of the clamp body onto the splice bar of FIG. 6.
Figure 9:
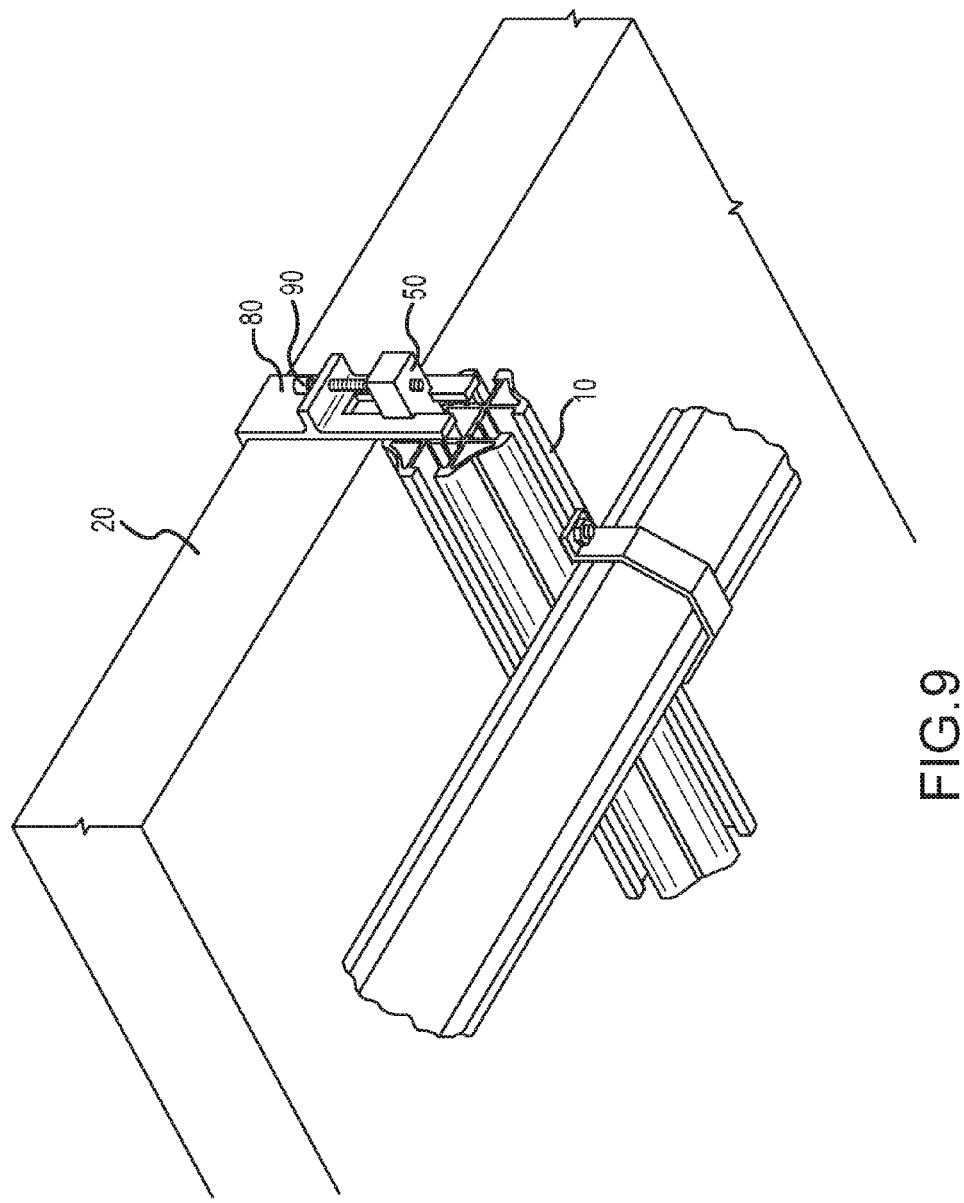
FIG. 9 illustrates compression of the PV panel against the rail.

FIGS. 6-9 illustrate use of the clamp 30 to affix a panel 20 to a rail 10. As shown in FIG. 6, a splice bar 50 is inserted into one of the recesses of a rail. Once at a desired depth (e.g., the notches 58 extend beyond the end of rail 10), a set screw may be threaded through the first threaded aperture (not shown) to affix the splice bar within the rail 10. At this time, a panel 20 may positioned proximate to the end of a rail 10. See FIG. 7. Once the panel is positioned, the legs of the clamp body may be disposed through the notches of the splice bar 50. See FIG. 8. The legs of the clamp body may be lowered through the notches until the engagement element 84 engages the top surface of the panel 20. At this time, the bolt 90 may be inserted through the aperture in the tab and into the second threaded aperture of the splice bar 50. The bolt may then be tightened to compress the panel 20 against the rail 10. See FIG. 9.

As noted above, the length of the legs is selected to provide continuous adjustment. In this regard, when the tab 88 rests against the top of the splice bar 50 the engagement element 84 has a minimum height. Furthermore, if the splice bar 50 is positioned into the lower recess within the rail 10 this minimum height may selected to allow the engagement element 84 to sit directly on the top surface of the rail 10. Thus, the clamp 30 may be utilized to affix multiple different sized objects to a rail 10.

Figure 10:
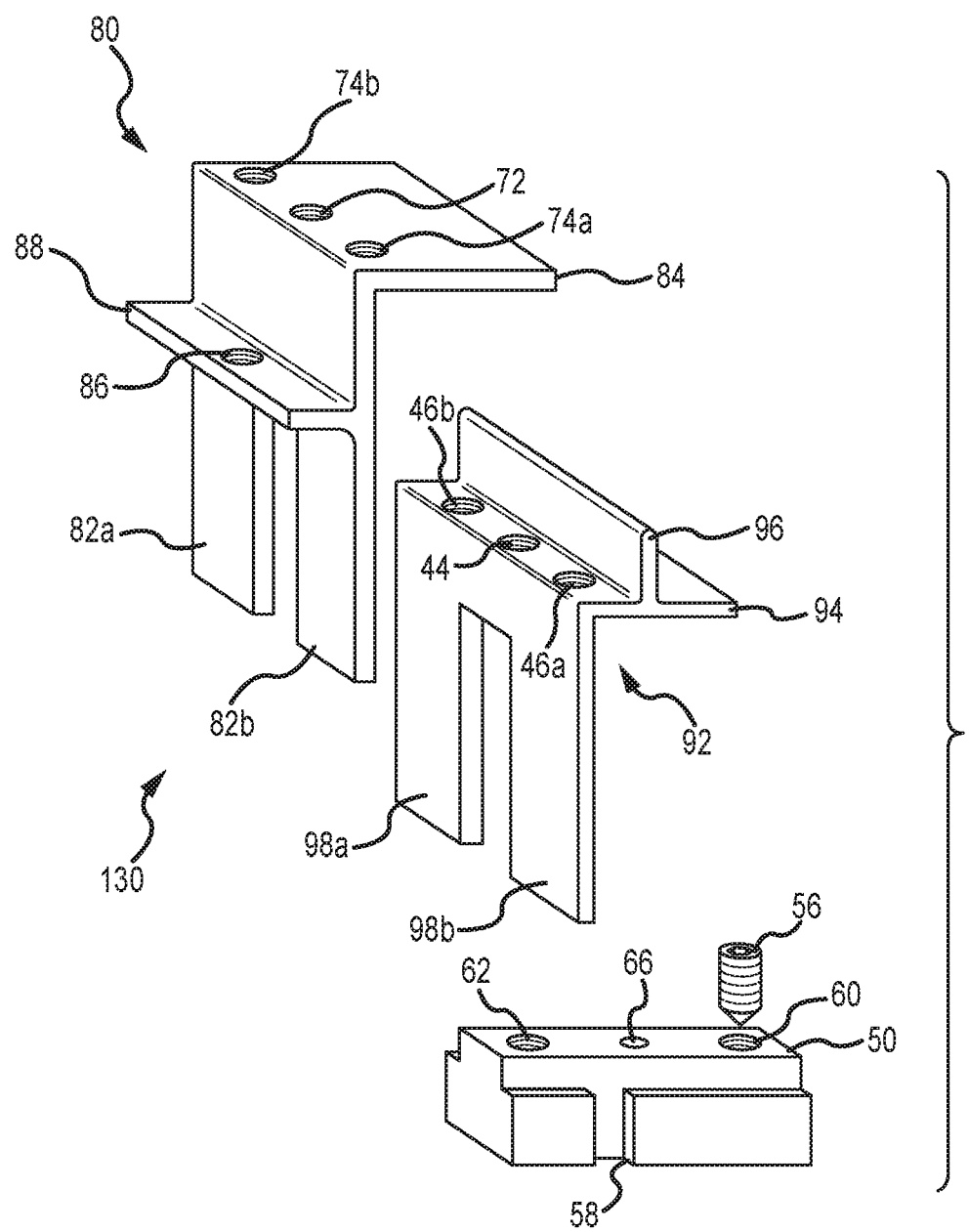
FIG. 10 illustrates an exploded view of another embodiment of an adjustable clamp.
Figure 11:
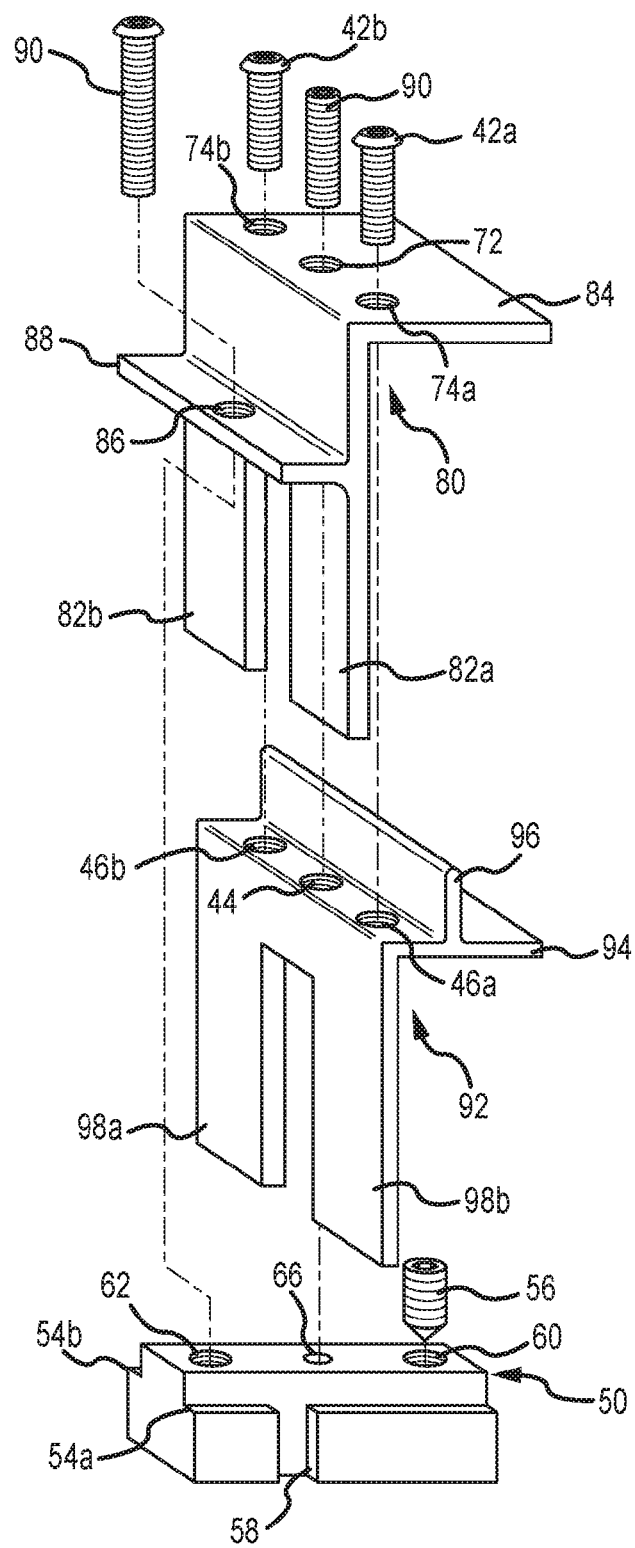
FIG. 11 illustrates an exploded view of the adjustable clamp of FIG. 10 including connection points.
Figure 12:
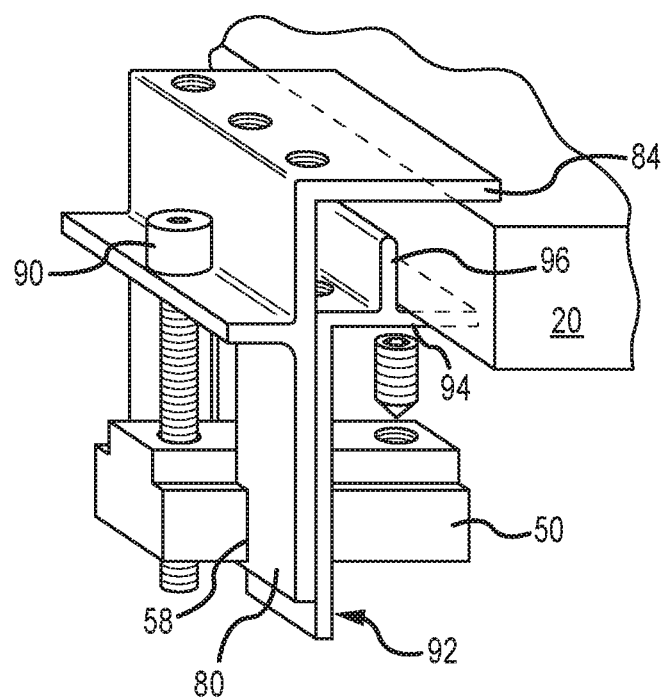
FIG. 12 illustrates the embodiment of FIG. 10 as assembled.

FIGS. 10-12 illustrate a further embodiment of a continually adjustable clamp 130 that may be utilized to secure an object such as a PV panel relative to a rail. Similar components of the illustrated embodiment of the clamp 130 share common reference numbers with the clamp 30 of FIGS. 3-5. As shown, this embodiment of the clamp 130 further includes a second clamp body 92. That is, the clamp body 80 forms a first clamp body having an engagement element 84 that is adapted to engage a top surface of an object such as a PV panel 20 while the second clamp body 92 includes a second engagement element 94 that is adapted to engage a bottom surface of an object such as a PV panel 20. As shown, the first clamp body 80 is substantially identical to the clamp body 80 of the embodiment of FIGS. 3-5, with the exception that the generally horizontal engagement element 84 includes three apertures 72, 74a and 74b, as more fully discussed herein.

The second clamp body 92 has a lower portion and includes first and second spaced legs 98a, 92b. Again, these legs define a space or recess there between. The spacing between the legs 92a, 92b is sized to permit the clamp body 92 to be received within the lateral notches 58 of the splice bar 50 is illustrated in FIG. 12. As shown, the first clamp body 80 and second clamp body 92 are configured to be juxtaposed (e.g., face to face) when the legs 82a, 82b and 98a, 98a are disposed through the notches 58 of the splice bar 50. In this regard, it will be appreciated that splice bar 50 substantially identical to the above described splice bar with the exception that the notches 58 may be wider to accommodate the two clamp bodies 80, 92.

As noted, an upper portion of the second clamp body 92 includes an engagement element 94. The engagement element 94 substantially perpendicular to the legs 98a, 98b. In this regard, engagement element 94 is considered substantially horizontal for purposes of discussion. Disposed along the length of the engagement element 94 is a vertical tab 96. This vertical tab abuts against the end of the panel 20 when the panel 20 is compressed between the clamp bodies 80, 92. See FIG. 12. In addition, the illustrated embodiment of the engagement element 94 includes three threaded apertures 44, 46a and 46b.

As Shown in FIGS. 11 and 12, once the second clamp body or inner-clamp body 92 is received within the notches 58 of the splice bar 50 and a panel 20 is disposed on a top surface of the engagement element 94, the first clamp body or outer-clamp body 80 is disposed through the notches 58 of the splice bar such that the engagement element extends over top surface of the panel 20. At this time, the clamp engagement bolts 42a, 42b may be inserted through the apertures 74a, 74b in the engagement element 84 of the first clamp body 80. These bolts 42a, 42b extend through the engagement element 84 where they are received by the threaded apertures 46a, 46b in the engagement element 94 of the second clamp body 92. Threading these bolts 42 into the mating apertures 46 results in compressing the panel 20 between the clamp bodies 80, 92.

The height of the panel 20 may be adjusted relative to the rail (not shown) using the bolt 90 extends through the tab 88 of the first clamp body. That is, this bolt 90 may extend through the tab 88 and into the threaded aperture 62 in the splice bar 50. In addition, the second threaded set screw or bolt 40 may extend through the central aperture 72 in the engagement element 84 of the first clamp body 80, through the mating aperture 44 in the engagement element 94 of the second clamp body 92 and extend to a detent 66 on a top surface of the splice bar 50. See FIG. 11. In this regard, the bolt 90 or bolts 90 and 40 may be utilized to adjust the height of the panel above a rail. Though discussed as inserting and compressing the panel 20 prior to adjusting the height of the clamp bodies, it will be appreciated that the process steps may be reversed. That is, the height of the clamp bodies may be adjusted prior to insertion and clamping of the PV panel.

Figure 13:
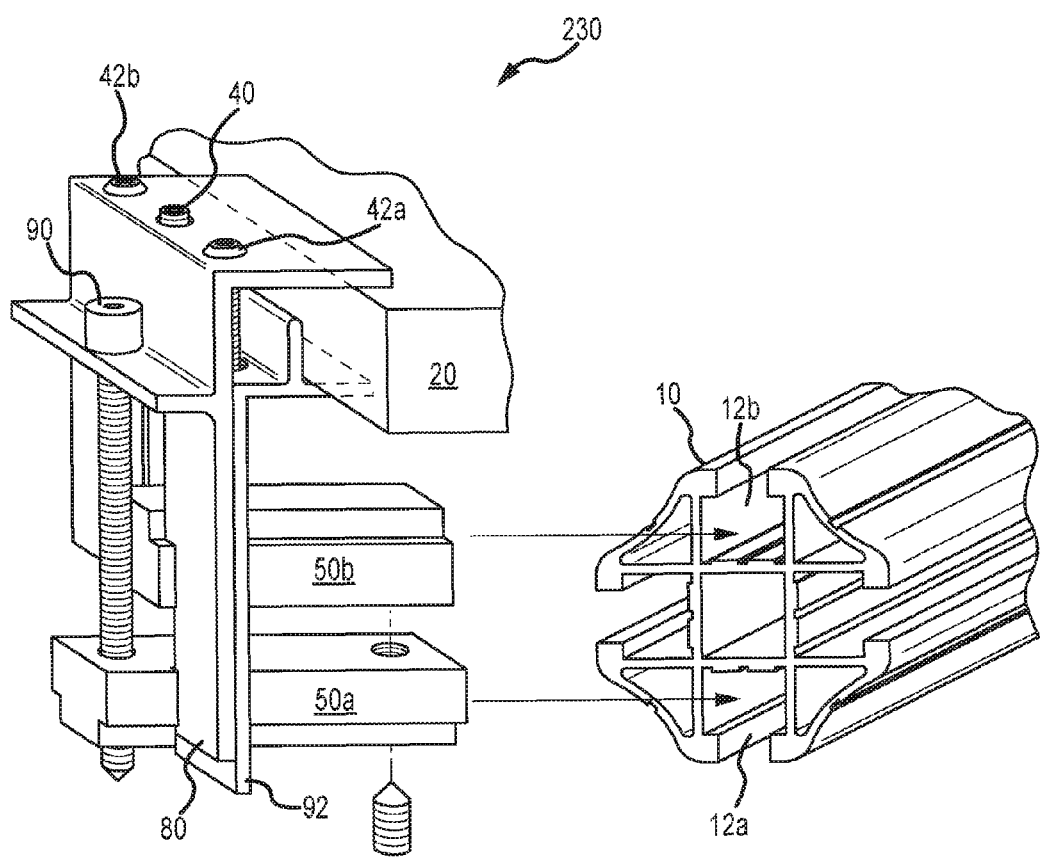
FIG. 13 illustrates a further embodiment of an adjustable clamp.

FIG. 13 illustrates a yet further embodiment of a clamp 230. As shown, the embodiment of FIG. 13 is substantially identical to the embodiment of FIGS. 10-12 with the exception that this embodiment utilizes first and second splice bars 50a and 50b. In this embodiment, the lower splice bar 50a is adapted for receipt within a lower channel 12a of a rail 10 and the upper splice bar 50b is adapted for receipt within an upper channel 12b of the rail 10. In the illustrated embodiment, the upper splice bar 50b does not extend through the legs of the clamp bodies 80, 92 as far as lower splice bar 50b. That is, the bolt 90 passes through the tab of the first clamp body 80 and only engages the threaded aperture in the lower splice bar 50a. However this is not a requirement and it will be appreciated that the upper splice bar may include an aperture for receiving the bolt 90 as well. It will be further appreciated that the use of first and second splice bars may be utilized with any embodiment the clamp disclosed herein.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. For instance, the rail itself could have lateral notches that receive the legs of the clamp body. In such an arrangement, a nut may be inserted into the rail to allow tightening of the clamp body. Further different aspects of the different embodiments may be utilized in different combinations. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A clamp, comprising:
    a splice bar configured for slidable receipt within a recess or channel of a rail, including:
        first and second lateral notches along a length of a body of said splice bar;
        a threaded aperture on proximate to a first end of said body;
    a sliding clamp body, including
        a lower portion having first and second spaced legs, wherein said spaced legs are sized for sliding engagement with said notches;
        an upper portion having an object engaging element; and
        a tab on a rearward surface between said upper and lower portions, said tab having an aperture; and
    a bolt, wherein said bolt passes through said aperture of said tab and threadably engages said threaded aperture of said splice bar.

* * * * *